United States Patent
Kashyap et al.

(10) Patent No.: US 7,116,673 B2
(45) Date of Patent: Oct. 3, 2006

(54) QUEUE PAIR RESOLUTION IN INFINIBAND FABRICS

(75) Inventors: Vivek Kashyap, Beaverton, OR (US); Danny Marvin Neal, Round Rock, TX (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 09/925,583

(22) Filed: Aug. 9, 2001

(65) Prior Publication Data

US 2003/0031183 A1 Feb. 13, 2003

(51) Int. Cl.
*H04L 12/56* (2006.01)
*H04L 12/28* (2006.01)

(52) U.S. Cl. ............... 370/412; 370/395.7; 370/389; 370/413; 370/409; 370/397; 370/395.71; 370/252

(58) Field of Classification Search ............... 370/352, 370/401, 392, 252, 236, 395.2, 412, 413, 370/389, 409, 397, 395.7, 395.71; 711/153, 711/163, 173, 113, 114, 118, 119, 112; 709/201, 709/202, 216, 224, 228
See application file for complete search history.

(56) References Cited

U.S. PATENT DOCUMENTS

| | | | |
|---|---|---|---|
| 6,459,698 B1 * | 10/2002 | Acharya | 370/392 |
| 6,473,424 B1 * | 10/2002 | DeJager et al. | 370/389 |
| 6,480,500 B1 * | 11/2002 | Erimli et al. | 370/412 |
| 6,578,122 B1 * | 6/2003 | Beukema et al. | 711/163 |
| 6,598,144 B1 * | 7/2003 | Bailey et al. | 711/203 |
| 6,611,883 B1 * | 8/2003 | Avery | 710/22 |
| 6,694,361 B1 * | 2/2004 | Shah et al. | 709/222 |
| 6,775,719 B1 * | 8/2004 | Leitner et al. | 710/33 |
| 6,810,418 B1 * | 10/2004 | Shah et al. | 709/223 |
| 6,816,889 B1 * | 11/2004 | Graham | 709/213 |
| 6,829,685 B1 * | 12/2004 | Neal et al. | 711/153 |
| 6,832,297 B1 * | 12/2004 | Pfister et al. | 711/144 |
| 2002/0133620 A1 * | 9/2002 | Krause | 709/238 |
| 2002/0133622 A1 * | 9/2002 | Pinto | 709/242 |
| 2002/0141424 A1 * | 10/2002 | Gasbarro et al. | 370/412 |
| 2003/0105914 A1 * | 6/2003 | Dearth et al. | 711/6 |

* cited by examiner

*Primary Examiner*—Ricky Q. Ngo
*Assistant Examiner*—Feben Micael Haile
(74) *Attorney, Agent, or Firm*—Duke W. Yee; Casimer K. Salys; Wayne P. Bailey

(57) ABSTRACT

A method for determining parameters needed to communicate with a remote node in a computer network is provided. The invention comprises determining the location of the remote node to which an InfiniBand (IB) node might desire to communicate. This resolution comprises determining the location of the remote node based on a desired application or service, and then determining the IB parameters needed to communicate with the remote node. The resolution might also involve determining the specific queue pairs that associated with the service dynamically. The general solution is applied to IP service resolution.

5 Claims, 5 Drawing Sheets

| TRANSPORT | SERVICE LEVEL | PATH MTU | P_KEY | QPN | EE CONTEXT Q_KEY | OTHERS |
|---|---|---|---|---|---|---|
| RAW ETHERTYPE | YES | YES | NO | NO | NO | NO |
| RAW IPv6 | YES | YES | NO | NO | NO | NO |
| UNRELIABLE DATAGRAM | YES | YES | YES | YES N-MULTICAST | Q_KEY | NO |
| RELIABLE DATAGRAM | YES | YES | YES | YES | EEC | YES |
| UNRELIABLE CONNECTED | YES | YES | YES | YES | NO | YES |
| RELIABLE CONNECTED | YES | YES | YES | YES | NO | YES |

QUEUE PAIR RESOLUTION IN INFINIBAND FABRICS

BACKGROUND OF THE INVENTION

1. Technical Field

The present invention relates generally to communication over computer networks, and more specifically to a method for the resolution of addresses and queue pairs associated with a particular application.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The channel interface (CI) interprets verbs and directly accesses the channel adapter.

Infiniband ports support multiple queue pairs. A number, called the Queue Pair Number (QPN) is associated with each queue pair. Any communication (for the IB transport modes) is thus addressed to a particular QPN. The receiver, based on the QPN, sends the packet to the relevant QP. If the QP is tied to a particular service or process, the packet demultiplexing is efficiently achieved in hardware, as opposed t handling this function after accepting the packet into a common input queue.

However, the communication between two endpoints is only possible if the two endpoints know each other's location and other parameters required by the IB fabric to send the packet to the desired destination.

Therefore, it would be desirable to a have a method for determining the location and IB parameters necessary to communicate with remote peers.

SUMMARY OF THE INVENTION

The present invention provides a method for determining parameters needed to communicate with a remote node in a computer network. The invention comprises determining the location of the remote node to which an InfiniBand (IB) node might desire to communicate. This resolution comprises determining the location of the remote node based on a desired application or service, and then determining the IB parameters needed to communicate with the remote node. The resolution might also involve determining the specific queue pairs that associated with the service dynamically. The general solution is applied to IP service resolution.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having end nodes, switches, routers, and links interconnecting these components. Each end node uses send and receive queue pairs to transmit and receive messages. The end nodes segment the message into packets and transmit the packets over the links. The switches and routers interconnect the end nodes and route the packets to the appropriate end node. The end nodes reassemble the packets into a message at the destination.

Figure 1:
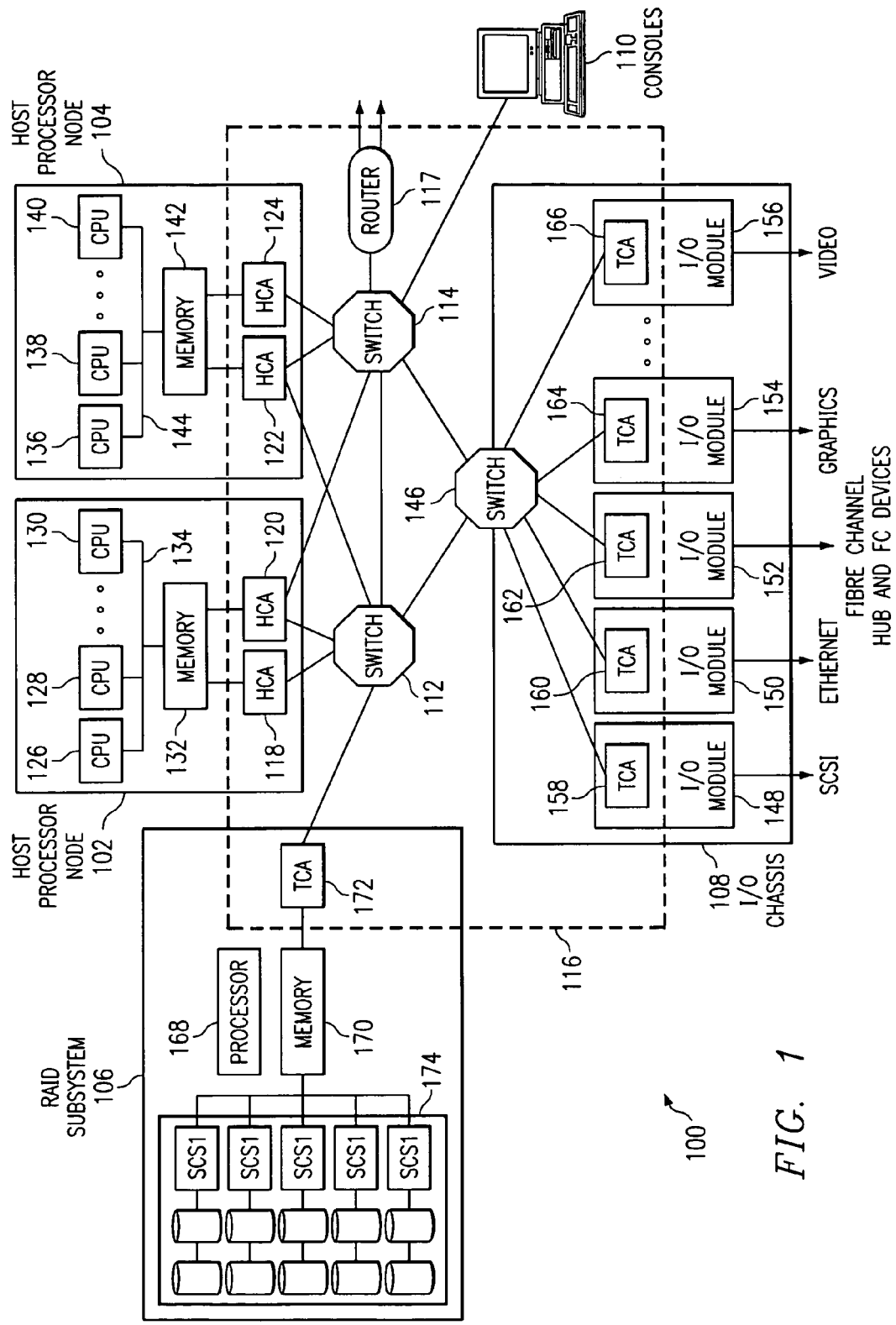
FIG. 1 depicts a diagram of a networked computing system in accordance with a preferred embodiment of the present invention.

With reference now to the figures and in particular with reference to FIG. 1, a diagram of a networked computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the packets through the SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing packets from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

Figure 2:
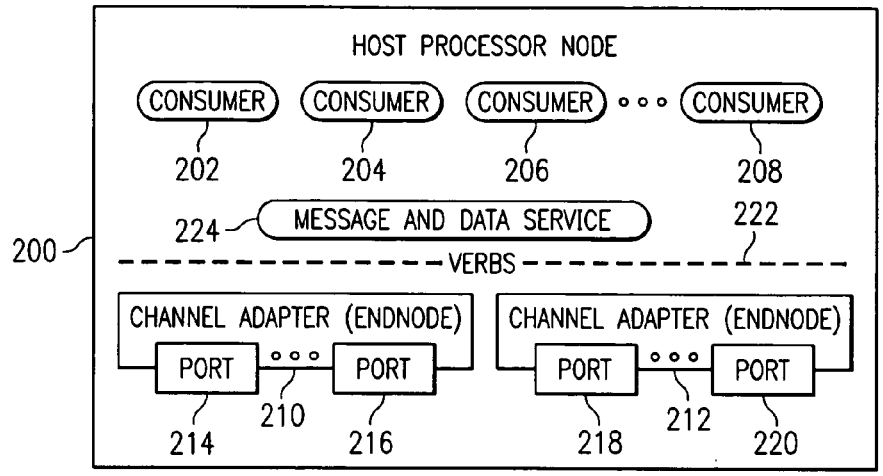
FIG. 2 depicts a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
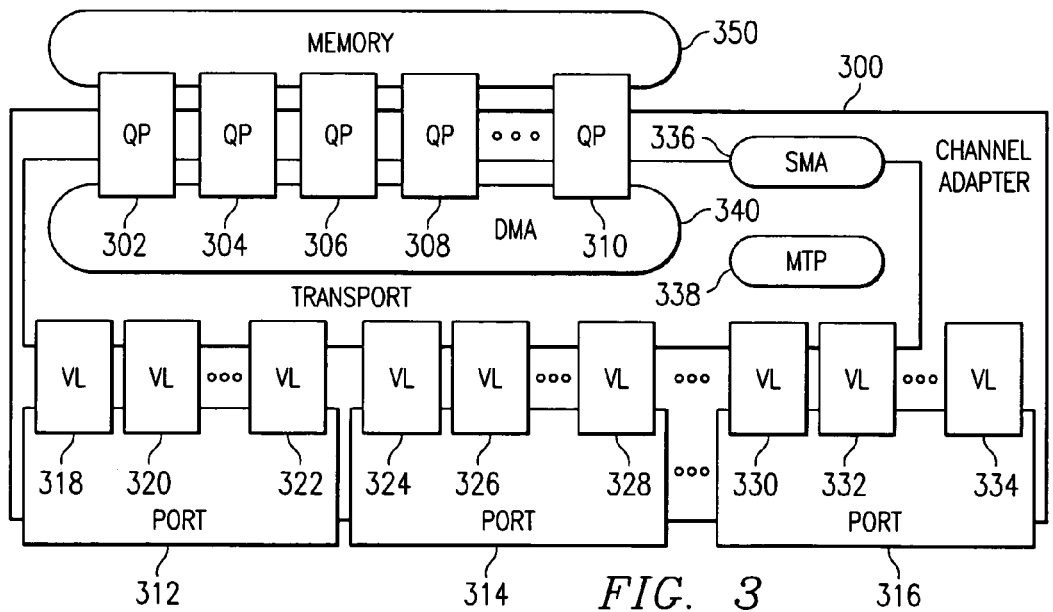
FIG. 3 depicts a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 350 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place Work Requests onto a Work Queue (WQ).

Figure 4:
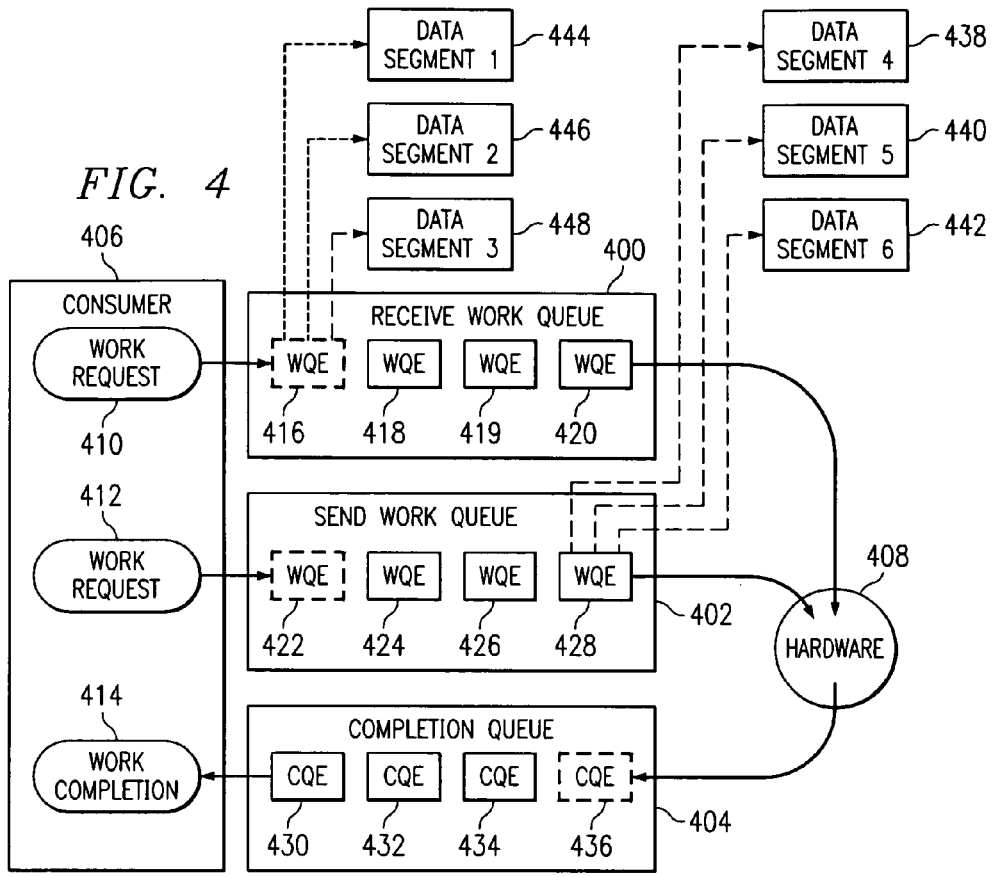
FIG. 4 depicts a diagram illustrating processing of Work Requests in accordance with a preferred embodiment of the present invention.

With reference now to FIG. 4, a diagram illustrating processing of Work Requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates Work Requests 410 and 412 and receives work completion 414. As shown in FIG. 4, Work Requests placed onto a work queue are referred to as Work Queue Elements (WQEs).

Send work queue 402 contains Work Queue Elements (WQEs) 422–428, describing data to be transmitted on the SAN fabric. Receive work queue 400 contains WQEs 416–420, describing where to place incoming channel semantic data from the SAN fabric. A WQE is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed Work Queue Elements. Completion queue 404 is used to create a single point of completion notification for multiple queue pairs. A completion queue element is a data structure on a completion queue. This element describes a completed WQE. The completion queue element contains sufficient information to determine the queue pair and specific WQE that completed. A completion queue context is a block of information that contains pointers to, length, and other information needed to manage the individual completion queues.

Example Work Requests supported for the send work queue 402 shown in FIG. 4 are as follows. A send Work Request is a channel semantic operation to push a set of local data segments to the data segments referenced by a remote node's receive WQE. For example, WQE 428 contains references to data segment 4 438, data segment 5 440, and data segment 6 442. Each of the send Work Request's data segments contains a virtually contiguous Memory Region. The virtual addresses used to reference the local data segments are in the address context of the process that created the local queue pair.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

An Atomic Operation work queue element provides a memory semantic operation to perform an atomic operation on a remote word. The Atomic Operation work queue element is a combined RDMA Read, Modify, and RDMA Write operation. The Atomic Operation work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Reliable and Unreliable connected services associate a local queue pair with one and only one remote queue pair. Connected services require a process to create a queue pair for each process which is to communicate over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 5:
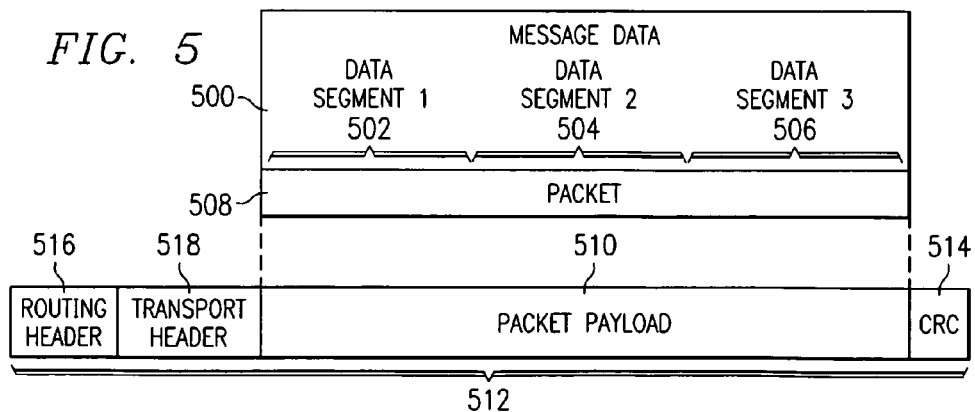
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport header 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

An IB fabric is expected to support multiple services hosted on multiple servers. However, the clients to the services do not know beforehand the location of these services, nor do they know how to get to these servers. The present invention provides a method to solve the above problems in the generic context of an IB application, and in the specific case of IP address resolution. A method is also presented to determine the queue pair (QP) associated with the services on a particular location.

When a process wants to communicate to an application or service on the network, the process must know the location where the service is hosted. This is known as the service location process. Once the service is located, the link address (IB LID) and other parameters need to be determined. Examples of other parameters include Service Level (SL) and Path Maximum Transmission Unit (PMTU). This process is known as the address resolution phase. The determination of the Queue Pair Number (QPN) associated with the service and/or the particular connection on a host is termed QPN resolution. IB transport mode communication relies on the successful completion of the above-described resolution processes.

Figures 6, 7:
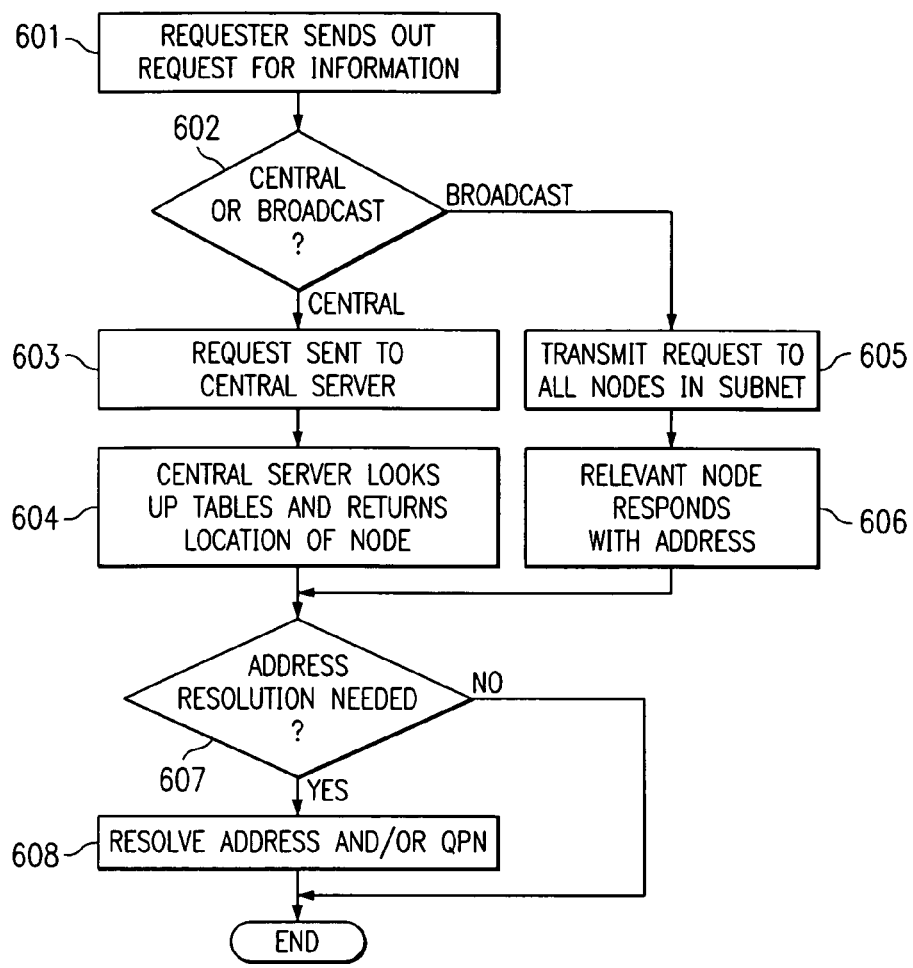
FIG. 6 depicts a flowchart illustrating service location resolution in accordance with the present invention.
FIG. 7 depicts a table illustrating the relationship of auxiliary data to transport services, in accordance with the present invention.

Referring to FIG. 6, a flowchart illustrating service location resolution is depicted in accordance with the present invention. During the resolution processes, there are two ways to determine necessary information: ask for the information, or be told the information. Final parameters may then be derived from the information. When a requester sends out a request for information (step 601), the information may be requested from a central repository or from all listeners in the network (step 602).

When requesting information from a centralized repository during the address resolution process, queries are sent to a central server (step 603), which looks up its tables and returns the location of the desired network node (step 604). The returned information may include all of the information needed to resolve the address and QPN, or it may simply include the basic address of the desired node. The requester determines if additional resolution is necessary based on the content of the reply (step 607). For example, if a service belonging to the Internet Protocol (IP) family of protocols is requested, then the IP address of the node could be returned. In such a case, the requester will have to resolve the IP address to the IB address and parameters in the address resolution phase (step 608). By contrast, if all necessary resolution data is sent in the reply, then no additional resolution processes are necessary.

The centralized approach assumes that the nodes know how to reach the centralized service. Additionally, each of the nodes registers its parameters and services with the centralized service.

When requesting information by means of the broadcast approach, the request for service resolution is transmitted to all the nodes on the subnet (step 605). The relevant node, or a node fronting for it (proxy), replies with the requested information (step 606). As with the centralized method, the returned information can be complete enough to resolve the address and the QPN, or it may require an address and/or QPN resolution phase (step 608).

In the service location resolution process, a service may be identified based on a well-known name. In the case of a TCP/IP suite of applications, the address may be based on the protocol type and the port used to communicate to the application. Such a setup is possible if the TCP/IP application has a well-known port. The service resolution request inquires about the location of a service. In reply, it will receive the node on which the application is hosted. This reply could contain the actual values that are needed to access the node or another label that uniquely identifies the node. For example, the node name could be the IP address or the domain name of the host that must be resolved to the IP address.

In the address resolution process, the node label received during service location resolution is then resolved to the IB address, so that communication to the remote end can be established. If a host domain name is received, then it can be resolved to the IP address. If the GUID is received, then the address parameters may be determined by way of asking the Subnet administrator. In the case of IP, the Address Resolution Protocol (ARP) as defined in RFC826 can be extended to InfiniBand, as explained below.

InfiniBand address resolution is basically a mapping from the IP address to the link layer address. In IB fabrics, the destination port is identified by its Local ID (LID). In the present disclosure, the term "link identifier" will refer to the LID, and the other values needed to talk to a peer will be referred to as auxiliary information. Together, the two constitute the link layer address.

Referring to FIG. 7, a table containing examples of auxiliary information is depicted in accordance with the present invention. An IB packet requires additional auxiliary information before it can be transmitted between two endpoints. The simplest case is in the context of raw datagrams: In addition to the destination LID, the packet also requires the SL and the path MTU. As the complexity of the IB transport increases, more information is required and is reflected in the IB extension headers in the data packet. For example, when using Unreliable Datagrams (UD), in addition to the path MTU and SL, the packet header will contain QPN of the destination QP, the Q_key and the Partition Key (P_Key).

As FIG. 7 shows, there are different and large amounts of auxiliary data needed for each of the transport services offered on IB fabrics. The QPN is used for communication between any two endpoints for all transports except raw datagrams. The Q_Key value is used for UD communication, but is not needed for UD multicast. The End-to-End (EE) Context information is used when setting up RD communication. For connected mode, the rest of the information is exchanged at the time of connection setup, as defined in the IB specification.

All of the resolution processes, whether service, address, or QPN resolution, includes two messages:
REQUEST: ask for the parameters
REPLY: return the requested parameters As explained above, the request might be asked off of a central server, or could be asked in a broadcast message (multicast). The reply may be broadcast or directed to the original requester.

The present invention suggests the following as the basic content of any resolution packet:
Name (e.g. IP address, application name)
Local Identifier (LID)
Supported Capabilities (capability flags)
Requested Capabilities (capability flags)
Service ID
Queue Pair Number (QPN)
Q_Key/EE_Context
P_Key
Service Level (SL)
Path MTU (PMTU)

It should be noted that some of the parameters in the request/response packet might not be used, depending on the entity being resolved or the agreement on a particular entity's resolution.

The name is the label to be resolved. It could be the IP address, the application name, or any other value that could be used to identify a particular application or node. Q_Key, P_Key, EE_Context, and SL are the values associated with the name.

The LID is the Local Identifier associated with the port to be used to reach the service.

Capability Flags are the first 6 bits which denote the IB transports supported at the endpoint, as follows:
UD—unreliable datagram
UC—unreliable connected
RC—reliable connected
RD—reliable datagram
RE—raw ethertype
R6—raw IPv6

The Supported Capabilities flags indicate the IB transports over which the service is offered at the sender. If included in the request packet, the Requested Capability flags denote the requested service. In reply packets, the Requested Capability flags denote the service for which the auxiliary data applies.

The QPN flag indicates that the endpoint supports applications that are tied to specific QPs. This implies that it supports service ID mapping in the request. If the flag is set to 0, then there is no such support. All the IP data flows to a single QP, the one in the QPN field.

The Service ID may be described in a well-known way. The InfiniBand Specification gives a mode of specifying Services in a generic way (Vol. 3, Ch. 10). For example, one could define the ServiceID associated with the IP suite of services as follows:
<16 bit name space><upper layer protocol>:<32 bit port>

If the responder does not support the mapping, it sets the QPN flag to 0 in its reply.

If the QPN flag is set in the request packet, then it implies that the sender supports service ID resolution. ServiceID itself is the service for which the query is being made. The value may be all 0's, which indicates a "don't care" value. The request is always for the Name. The ServiceID is in addition to the Name being resolved. The Name and ServiceID may be the same.

If the QPN flag is not set in the Requested Capabilities field of the reply packet, the responder does not support QPN resolution. ServiceID value indicates that the reply is for the service ID indicated. A value of all 0's implies there is not such association. All of the data can flow to the QP indicated.

For example, the name could be the IP address. The service ID could be associated with a particular application. The reply would therefore indicate the QP on which the relevant communication must take place.

An application could send multiple ServiceIDs and QPNs in a single request or reply.

The target will not reply if the SLs are not applicable. A SL may not be valid from the target's point of view either because the SL does not provide a valid path or it is precluded from using that SL as per some policy.

If the sender knows the PMTU, it can send the value to the other end. This value may be smaller than the actual PMTU for the path, in case the sender cannot for some reason accept larger values.

The following is an example of application name resolution:

REQUEST packet:
  Name: APP
  LID—gives the LID of the requester
  QPN—gives the QPN of the requester
REPLY packet would then be:
  Name: APP
  LID—gives the LID of the server hosting APP
  QPN—gives the QPN associated with APP at the server.

Note that not all of the parameters are included in the above resolution process. The present invention does not preclude the responder from determining some of the parameters from the SA after determining the LID.

IP address resolution is implemented based on the Address Resolution Protocol (ARP) as defined in RFC826. It involves the broadcasting of the request packet, followed by the responder replying with a reply packet unicast to the original requester. The present format of the request/reply packet can be mapped to the ARP packets.

The ARP packet structure is defined as:
  16 bits: hardware protocol (e.g. IB)
  16 bits: protocol (e.g. IP)
  8 bits: length of hardware address
  8 bits: length of protocol address
  16 bits: ARP operation (e.g. REQUEST/REPLY)

The remaining fields in the packets hold the sender/target hardware and protocol addresses:
  [sender hardware address]
  [sender protocol address]
  [target hardware address]
  [target protocol address]

The request/reply packet structure defined above could be used as the hardware address in the ARP packet. Thus, the hardware address used by the ARP packet would be:
  16 bits: LID
  16 bits: capability flag
  8 bits: supported capabilities
  8 bits: requested capabilities
  48 bits: service ID
  24 bits: QPN
  32 bits: Q_Key/EE_Context
  16 bits: P_Key
  16 bits: SL
  16 bits: PMTU These fields are used as described above. Therefore, the standard IP resolution can be extended to InfiniBand and also include QP and ServiceID resolution.

Queue Pair (QP) resolution is necessary because multiple QPs may be associated with a particular node. The QP Number (QPN) is carried in IB transport packets and allows the receiver to associate the packet directly with the relevant QP. Such an operation delegates the demultiplexing of packets to the hardware, rather than having the software look through and match the incoming packets with their recipients. This downloading of packet demultiplexing function to the hardware is highly efficient and increases system performance by reducing the software-processing load. Therefore, it is useful if the QPs could be associated with a particular connection or with particular services.

QPN resolution is the association of the QPN with a particular service or a particular connection/data stream. The present invention provides three ways of resolving QPNs.

Figure 8:
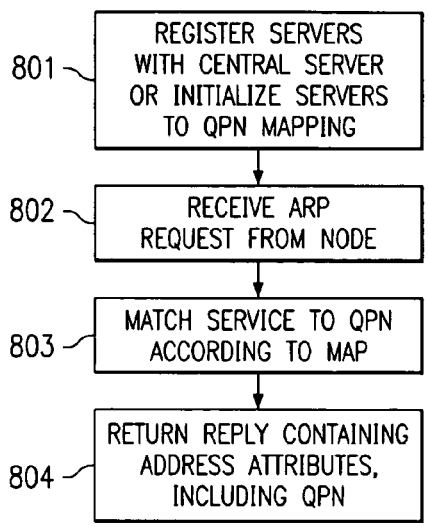
FIG. 8 depicts a flowchart illustrating a process of QPN resolution for IP in accordance with the present invention.

Referring to FIG. 8, a flowchart illustrating a process of QPN resolution for IP is depicted in accordance with the present invention. The first method of QPN resolution comprises either registering servers with a central server or initializing servers to PQN mappings (and possibly address mappings) (step 801). A requesting node sends an ARP request to the central server or broadcasts the ARP request to a multicast group of nodes (step 802). The queue pair number associated with the requested service is looked up in the service/QPN map (step 803). The central server (or node(s) in the multicast group) returns a reply, which contains the attributes needed to talk to the "IP Protocol" (e.g. ICMP) at the proper address: e.g., QPN value, LID, P_Key, SL, and Q_Key (step 804). Thus, the QPN resolution process is incorporated into the address resolution process.

Figure 9:
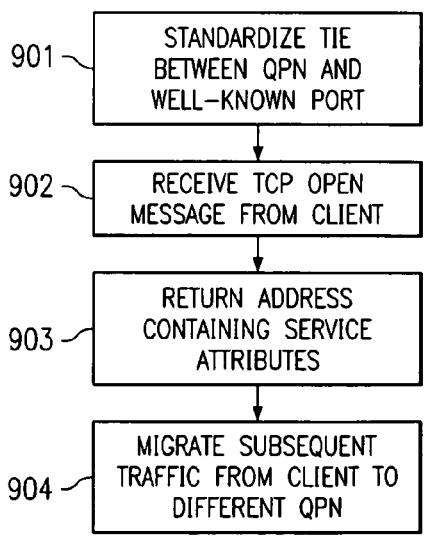
FIG. 9 depicts a flowchart illustrating a process for QPN resolution using well-known ports in accordance with the present invention.

Referring to FIG. 9, a flowchart illustrating a process for QPN resolution using well-known ports is depicted in accordance with the present invention. This process begins by standardizing a tie between a QPN and a well-known port (step 901). The standard allows an end-node's TCP/IP subsystem to tie the port/address quadruple to a non-well-known QP as part of the TCP open process. The tie between the QPN and the well-known port can be done in two ways.

In the first option, the IP QPN would be "the" QP to use for all set-ups. The passive side (server) O/S can then migrate traffic to a different QPN, which the active side would use for subsequent traffic.

In the second option, the IP QPN would be the QP to use for the least used well-known ports. The most heavily used well-known ports can get their own QP. The passive side O/S can migrate traffic to a different QPN, which the active side would use for subsequent traffic.

The requesting node sends a TCP open message (or first user datagram protocol (UDP) message) to the well-known QPN (step 902). The responding node hosting the service then replies to the TCP open with the service attributes: e.g., IP address, QPN (which may be redirected), LID, SL, P_Key, Q_Key (step 903). As stated above, the responding node may then migrate subsequent traffic to another QPN (step 904).

By using the well-known port method, the QPN value itself becomes a well-known characteristic by which the associated service or application is known. Such a step does not require a separate QPN resolution step, since the QPN is resolved by definition. This method allows QPN multiplexing of heavily used ports and eliminates the need for the HCA to support thousands of QPs.

Figure 10:
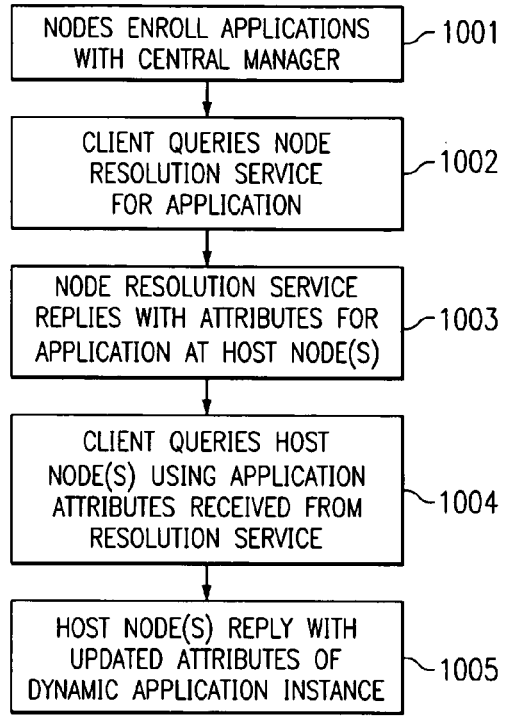
FIG. 10 depicts a flowchart illustrating the process of QPN resolution for dynamic ports in accordance with the present invention.

Referring to FIG. 10, a flowchart illustrating the process of QPN resolution for dynamic ports is depicted in accordance with the present invention. This method for QPN resolution comprises associating a QP with each connect request, or associating it with a particular service, application or requester. This takes full advantage of QP demultiplexing. When a request is received, the request is taken as the reason to create a new QP, and the new QPN value is returned to the requester.

The process begins by enrolling application services with a central manager (step 1001). This lets the central manager know the InfiniBand Address (IBA) attributes of (e.g. QPN) of a given application service. The active side (client) then queries the node resolution service to determine which nodes host a given application service (step 1002). The node resolution service replies with the IBA attributes of the application service at the node(s) hosting the service (step 1003). The QPN returned to the active side may be the default QPN for the application. The active side uses the IBA attributes received from the node resolution service to query the application on the host node(s) in order to determine the attributes needed to talk to a specific, dynamic instance of that application (step 1004). The host node(s) replies with the updated attributes for the dynamic instance of the application (step 1005).

For example, the resolution might be done based on a TCP port and an IP address. The reply from the node hosting the TCP service will include the QPN associated with all IP data. The receiver will then send its TCP connection request. This request includes its own port number and the IP address. The TCP server, on receiving the connect request, may set up a new QPN. This new QPN can then be returned to the requester as a gratuitous response. The requester will then be able to associate the QPN with the particular connection based on the port value included in the response.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining parameters needed to communicate with a remote node in a computer network, the method comprising:
    compiling a queue-pair-number map, wherein the map associates unique queue pair numbers with services hosted by network nodes;
    receiving a service request from a client;
    looking up the queue pair number associated to the requested service;
    replying to the client, wherein the reply includes:
        the address of the node hosting the requested service; and
        the queue pair number associated with the requested service;
    registering the network nodes with a central server, wherein the central server contains the queue-pair-number map;
    receiving a second service request from the client, wherein the second request is addressed to the queue pair number included in the first reply;
    associating a new queue pair number with a new dynamic instance of the requested service; and
    returning a second reply to the client, wherein the second reply includes the new queue pair number.

2. A method for determining parameters needed to communicate with a remote node in a computer network, the method comprising:
    associating a service hosted by the node with a well-known queue pair number, wherein the well-known queue pair number corresponds to at least one well-known port in the node;
    receiving a service request from a client, wherein the request is addressed to the well-known queue pair number; and
    replying to the client, wherein the reply contains attributes necessary for communication with the requested service, wherein the reply returned to the client includes a new queue pair number which differs from the well-known queue pair minter, wherein the new queue pair number is used by the client for subsequent communication with the service.

3. A computer program product in a computer readable medium for use in a data processing system, for determining parameters needed to communicate with a remote node in a computer network, the computer program product comprising:
    instructions for compiling a queue-pair-number map, wherein the map associates unique queue pair numbers with services hosted by network nodes;
    instructions for receiving a service request from a client;
    instructions for looking up the queue pair number associated to the requested service;
    instructions for replying to the client, wherein the reply includes:
        the address of the node hosting the requested service; and
        the queue pair number associated with the requested service;
    instructions for registering the network nodes with a central server, wherein the central server contains the queue-pair-number map;
    instructions for receiving a second service request from the client, wherein the second request is addressed to the queue pair number included in the first reply;
    instructions for associating a new queue pair number with a new dynamic instance of the requested service; and
    instructions for returning a second reply to the client, wherein the second reply includes the new queue pair number.

4. A computer program product in a computer readable medium for use in a data processing system, for determining parameters needed to communicate wit a remote node in a computer network, the computer program product comprising:
    instructions for associating a service hosted by the node with a well-known queue pair number, wherein the well-known queue pair number corresponds to at least one well-known port in the node;
    instructions for receiving a service request from a client, wherein the request is addressed to the well-known queue pair number; and
    instructions for replying to the client, wherein the reply contains attributes necessary for communication with the requested service, wherein the reply returned to the client includes a new queue pair number which differs from the well-known queue pair number, wherein the new queue pair number is used by the client for subsequent communication with the service.

5. A system for determining parameters needed to communicate with a remote node in a computer network, the system comprising:
    a compiler which compiles a queue-pair-number map, wherein the map associates unique queue pair numbers with services hosted by network nodes;

a receiver which receives a service request from a client;

a look-up component which looks up the queue pair number mapped to the requested service;

a response component which replies to the client, wherein the reply includes:

the address of the node hosting the requested service; and the queue pair number associated with the requested service;

a registration component which registers the network nodes with a central server, wherein the central server contains the queue-pair-number map;

a second receiver which receives a second service request from the client, wherein the second request is addressed to the queue pair number included in the first reply;

a processing component which associates a new queue pair number with a new dynamic instance of the requested service; and a second response component which sends a second reply to the client, wherein the second reply includes the new queue pair number.

* * * * *